(12) United States Patent
Morimoto et al.

(10) Patent No.: US 12,507,617 B2
(45) Date of Patent: Dec. 30, 2025

(54) WORK VEHICLE WITH QUALITY DETERMINATION DEVICE FOR GRASS

(71) Applicant: Kubota Corporation, Osaka (JP)

(72) Inventors: Susumu Morimoto, Amagasaki (JP); Mayuko Tonari, Amagasaki (JP); Ryuji Hashizume, Amagasaki (JP)

(73) Assignee: Kubota Corporation, Osaka (JP)

( * ) Notice: Subject to any disclaimer, the term of this patent is extended or adjusted under 35 U.S.C. 154(b) by 995 days.

(21) Appl. No.: 17/606,865

(22) PCT Filed: Apr. 15, 2020

(86) PCT No.: PCT/JP2020/016493
§ 371 (c)(1),
(2) Date: Oct. 27, 2021

(87) PCT Pub. No.: WO2020/261719
PCT Pub. Date: Dec. 30, 2020

(65) Prior Publication Data
US 2022/0210970 A1    Jul. 7, 2022

(30) Foreign Application Priority Data

Jun. 26, 2019  (JP) ................................. 2019-119004
Jun. 26, 2019  (JP) ................................. 2019-119005

(51) Int. Cl.
*A01F 15/10*  (2006.01)
*A01D 34/00*  (2006.01)

(52) U.S. Cl.
CPC ............ *A01D 34/006* (2013.01); *A01F 15/10* (2013.01)

(58) Field of Classification Search
CPC .... A01D 43/10; A01D 43/43; A01D 43/0631; A01D 43/0851; A01D 34/001;
(Continued)

(56) References Cited

U.S. PATENT DOCUMENTS 5,758,479 A     6/1998  Staheli
6,257,072 B1 *  7/2001  Diekhans ............. A01D 43/085
                                                          73/861.26
(Continued)

FOREIGN PATENT DOCUMENTS

DE     10204941 A1    8/2003
EP      1454519 A1    9/2004
(Continued)

*Primary Examiner* — Joseph M Rocca
*Assistant Examiner* — Ashley A Kaercher
(74) *Attorney, Agent, or Firm* — The Webb Law Firm

(57) ABSTRACT

A work vehicle configured to carry out work travel in a pasture land where harvested pasture grass 1 is present, the work vehicle having a quality determination device 20 configured to determine quality of the pasture grass 1 in the course of the work traveling. The quality determination device 20 includes a cylindrical grass sending tube 21, a grass taking section 22 configured to feed at least a portion of the pasture grass 1 left in the pasture land to an inside of the grass sending tube 21 via a first end of the grass sending tube 21 and a quality determination instrument 9 configured to determine quality of the pasture grass 1 compressed inside the grass sending tube 21.

12 Claims, 7 Drawing Sheets

(58) Field of Classification Search
CPC ..... A01D 34/006; A01D 34/063; A01F 15/08; A01F 15/10; G01N 21/3554
See application file for complete search history.

(56) References Cited

U.S. PATENT DOCUMENTS

| | | | |
|---|---|---|---|
| 6,421,990 B1 * | 7/2002 | Ohlemeyer | G01N 21/3563 356/328 |
| 2004/0200200 A1 * | 10/2004 | Quincke | A01D 43/085 56/10.2 R |
| 2007/0213106 A1 | 9/2007 | Degen et al. | |
| 2009/0286582 A1 * | 11/2009 | Kormann | A01D 41/127 56/10.1 |
| 2012/0192731 A1 | 8/2012 | Biziorek et al. | |
| 2013/0042591 A1 | 2/2013 | Behnke et al. | |

FOREIGN PATENT DOCUMENTS

| | | | | |
|---|---|---|---|---|
| EP | 1825740 A1 | 8/2007 | | |
| JP | 2018185594 A | 11/2018 | | |
| WO | WO-2018213439 A1 * | 11/2018 | | A01D 41/141 |

* cited by examiner

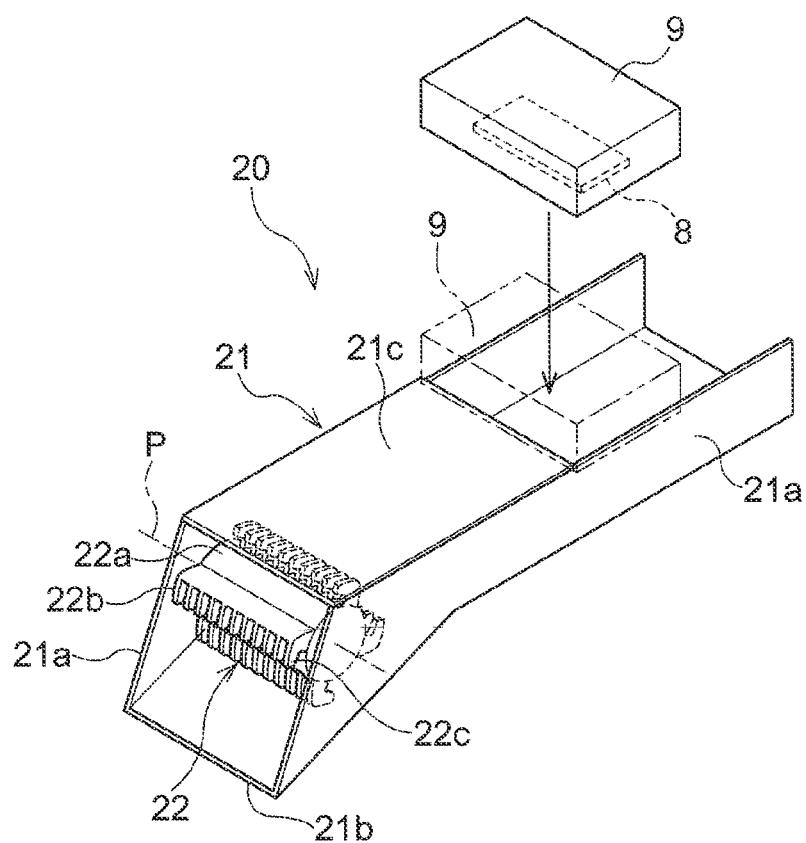
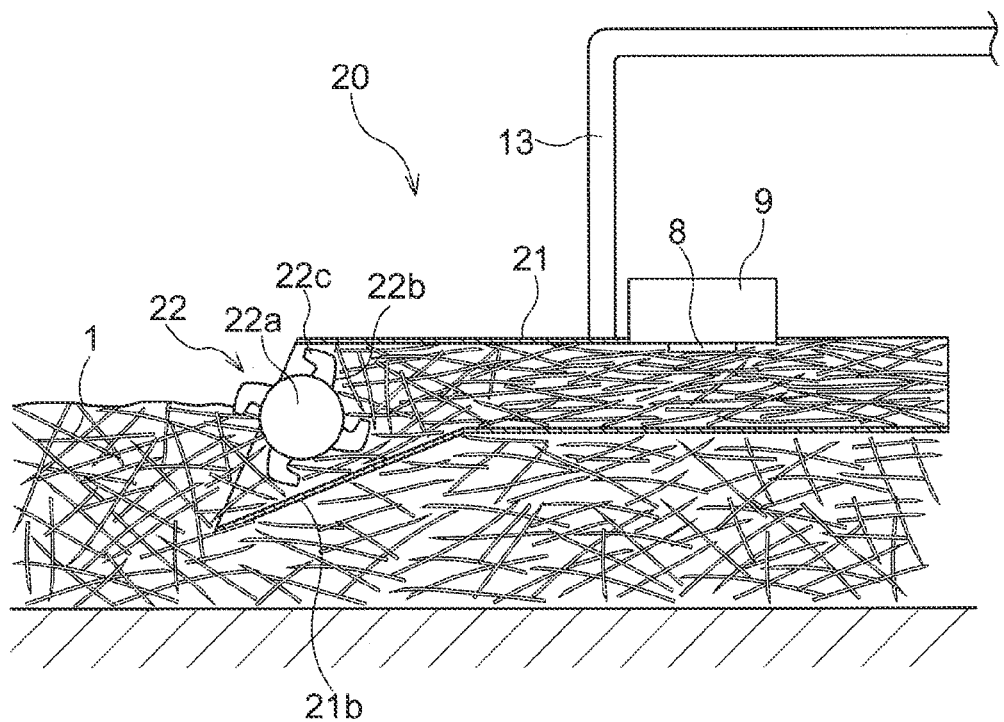

WORK VEHICLE WITH QUALITY DETERMINATION DEVICE FOR GRASS

CROSS-REFERENCE TO RELATED APPLICATIONS

This application is the United States national phase of International Application No. PCT/JP2020/016493 filed Apr. 15, 2020, and claims priority to Japanese Patent Application Nos. 2019-119004 filed Jun. 26, 2019, and 2019-119005 filed Jun. 26, 2019 the disclosures of which are hereby incorporated by reference in their entirety.

BACKGROUND OF THE INVENTION

Field of the Invention

The present invention relates to a work vehicle configured to determine quality of harvested pasture grass while traveling.

Description of Related Art

Pasture grass are employed as forage for livestock. Pasture grass employed as such forage are stored in e.g., a silo after their mowing in a pasture land or sun-dried firstly in the pasture land and then formed into a cylindrical roll bale and collected as such, Pasture grass are generally subjected to butyric acid fermentation for their nutritional improvement. In butyric acid fermentation, mold may be generated if the water content is too high. Further, in order to allow the fermentation to proceed appropriately, there arises a need to add an additive such as formic acid or the like. Thus, for allowing appropriate butyric acid fermentation, management of the water content of pasture grass is important. As disclosed in Patent Document 1, for determination of water content of pasture grass, it has been conventionally practiced to determine the water content of pasture grass using e.g. a water content determination device on pasture grass left in the pasture land immediately after their harvest or pasture grass collected in the pasture land after their harvest. Such water content determination device determines water content by irradiating light onto the pasture grass and then effecting a spectroscopic analysis of reflected light.

Patent Document 1: Japanese Unexamined Patent Application Publication No 2018-185594.

SUMMARY OF THE INVENTION

However, pasture grass left or collected in a pasture land are present in a sparse state with gaps present between the pasture grass. For this reason, when light is irradiated onto the pasture grass, there occurs diffused reflection, which prevents the water content determination device from receiving the light passed through the pasture grass appropriately. As a result, appropriate water content determination may sometimes become impossible. This problem is not limited to water content determination, but occurs also with other determination devices determining various qualities.

For solving the above-described problem, the object of the present invention is to determine quality of pasture grass with high accuracy.

For accomplishing the above-noted object, a work vehicle relating to one embodiment of the present invention comprises a work vehicle configured to carry out work travel in a pasture land where harvested pasture grass are left, the work vehicle comprising a quality determination device configured to determine quality of pasture grass in a course of the work travel;

wherein the quality determination device includes:
a cylindrical grass sending tube;
a grass taking section configured to feed at least a portion of the pasture grass left in the pasture land to an inside of the grass sending tube via a first end of the grass sending tube; and
a quality determination instrument configured to determine quality of the pasture grass compressed inside the grass sending tube.

Harvested pasture grass will be left over in the pasture land under a natural state without application thereto of any special pressure except for the gravity. For this reason, the pasture grass will be deposited in a sparse state, with the pasture grass being present having gaps therebetween. If quality determination is attempted on such pasture grass by irradiation of e.g. light thereon, diffused reflection may occur in the detection media such as light or the like (to be referred to simply as "light or the like" hereinafter), thus disabling appropriate quality determination.

With the above-described arrangement, in association with traveling of the work vehicle, the grass taking section takes in the pasture grass in the pasture land and packs them into the grass sending pipe (the grass sending tube). With this, the pasture grass present in a sparse state will be gradually compressed inside the grass sending pipe. As a result, the quality determination instrument can carry out quality determination with irradiation of light to the pasture grass having reduced gaps, so that the quality of the pasture grass can be determined with high accuracy with effective suppression of diffused reflection of the light or the like.

Further, there sometimes exists unevenness of quality in the left pasture grass between the upper layer part and the lower layer part of the pasture land. With the above-described inventive arrangement, the pasture grass are stirred and mixed when being taken in by the grass taking section. As a result, the pasture grass having varied qualities will be fed in a mixed state to the quality determination instrument, so that determination of average quality of pasture grass left in the pasture land becomes possible.

A work vehicle relating to one embodiment of the present invention includes a work vehicle including a harvesting section and configured to carry out harvesting travel in a pasture land, and a quality determination device configured to determine quality of pasture grass while carrying out work travel;

wherein the quality determination device includes:
a cylindrical grass sending tube;
a grass taking section configured to feed at least a portion of pasture grass harvested by the harvesting section to an inside of the grass sending tube via a first end of the grass sending tube; and
a quality determination instrument configured to determine quality of the portion of the pasture grass compressed inside the grass sending tube.

With the above-described arrangement, in association with traveling of the work vehicle, the grass taking section takes in the pasture grass harvested by the harvesting section and feeds and packs them into the grass sending tube. With this, the pasture grass present in a sparse state will be gradually compressed inside the grass sending tube. As a result, the quality determination instrument can carry out quality determination with irradiation of light to the pasture grass having reduced gaps, so that the quality of the pasture grass can be determined with high accuracy with effective suppression of diffused reflection of the light or the like.

Further, preferably, the portion of the pasture grass sent into the grass sending tube are discharged via the other end (a second end) of the grass sending tube to be merged with a portion of the pasture grass which was not sent into the grass sending tube.

With the above arrangement, as the pasture grass used in the quality determination are returned to the pasture grass which were not used for the determination, the pasture grass can be used without waste.

Further preferably, the work vehicle further comprises a conveying path for collecting and conveying the pasture grass, wherein one end (first end) and the other end (second end) of the grass sending tube are connected to the conveying path, and the grass sending tube bypasses the conveying path.

As examples of work vehicle, there are a harvester configured to collect pasture grass in a pasture land and stack them on a loader wagon, a truck, etc., and a roll baler configured to collect pasture grass in a pasture land and to form them into a roll bale. Such work vehicles have a conveying path for conveying collected pasture grass. The quality determination device can be mounted on these work vehicles also, and the quality determination device can be incorporated in the conveying path included in the work vehicles. If the quality determination device is included in the conveying path, quality determination can be carried out on each batch of collected pasture grass. Further, as the quality determination of pasture grass can be carried out in the course or a work, if the quality is found inappropriate, it is possible to take such measure as adding an additive to the pasture grass or suspending the work. As a result, improvement of work efficiency is made possible.

Further, preferably, the grass taking section is configured to adjust an amount of pasture grass to be sent into the grass sending tube in proportion with a traveling speed of the work vehicle.

With the above-described arrangement, an appropriate amount of pasture grass are sent into the grass sending tube at an appropriate speed, so that the pasture grass can be compressed in an efficient manner.

Further, preferably, the grass sending tube has a sectional area that is progressively decreased in at least a part of a section from the first end of the grass sending tube to an area where the quality determination device is disposed.

By progressively decreasing the cross sectional area of the grass sending tube toward the quality determination device, the pasture grass can be compressed in an efficient manner. Thus, diffused reflection of the light or the like can be suppressed easily, and the quality of pasture grass can be determined with high accuracy.

A work vehicle relating to one embodiment of the present invention comprises a work vehicle configured to carry out work travel in a pasture land, the work vehicle comprising a quality determination device configured to determine quality of pasture grass while carrying out the work travel; wherein the quality determination device includes:
  a grass pressing device for pressing the pasture grass;
  a quality determination instrument configured to determine the quality of the pasture grass pressed by the grass pressing device; and
  a supporting portion configured to support the grass pressing device vertically movably relative to the work vehicle.

Harvested pasture grass will be left in the pasture land under a natural state without application thereto of any special pressure except for the gravity. For this reason, the pasture grass will be deposited in a sparse state, with the pasture grass being present with gaps therebetween. If quality determination is attempted on such pasture grass by irradiation of e.g. light thereon, diffused reflection may occur in the detection media such as light or the like (to be referred to simply as "light or the like" hereinafter), thus disabling appropriate quality determination.

With the above-described arrangement, in association with traveling of the work vehicle, the grass pressing device presses the pasture grass to reduce the gaps therebetween, so the quality determination device can carry out the quality determination of the pasture grass under a dense state thereof. Further, since the grass pressing device is supported vertically movably, the grass pressing device can move up and down in response to repulsive force from the pasture grass. Therefore, there will not occur such inconvenience of the grass pressing device getting hooked with the grass to push out the pasture grass forwardly. Thus, the pasture grass can be pressed in an appropriate manner. For the reasons mentioned above, the work vehicle can determine the quality of pasture grass with high accuracy, with effective suppression of diffused reflection of the light or the like.

Further, preferably, the grass pressing device includes an elastic body configured to press down the grass pressing device.

With the above-described arrangement, as the grass pressing device can press the pasture grass more effectively by the elastic force of the elastic body, the diffused reflection of the light or the like can be suppressed to allow high accuracy determination of the quality of pasture grass.

Preferably, the supporting portion is vertically pivotally supported by a machine body of the vehicle.

With the above-described arrangement, even if the pasture grass are left under an undulated state, as the grass pressing device follows the undulation thanks to the vertically pivotable supporting portion, the pasture grass can be pressed in a more appropriate manner, whereby the diffused reflection of the light or the like can be suppressed to allow high accuracy quality determination of the pasture grass.

Preferably, the grass pressing device has an opening at which the quality determination instrument is provided.

If the quality determination device were provided in the face of the grass pressing device which presses the pasture grass, unevenness would be formed in this face of the grass pressing device which presses the pasture grass, which makes it impossible to press the grass in an efficient manner. With the above-described arrangement, the quality determination instrument can be provided in the reverse face of the grass pressing device relative to its grass pressing face. Therefore, the pasture grass can be pressed by the entire grass pressing face of the grass pressing device. As a result, the pasture grass can be pressed in an efficient manner.

Preferably:
  the quality determination device is mounted on and supported by the grass pressing device to determine the quality of the pasture grass through the opening; and
  the grass pressing device protrudes from the quality determination instrument on an outer circumferential side.

The quality determination instrument may suffer from determination accuracy reduction due to influence from light incident from the outside. With the above-described arrangement, as the quality determination instrument is provided in the reverse face of the grass pressing face of the grass pressing device, the light can be irradiated onto the compressed pasture grass through the opening. Simultaneously, the grass pressing device can block light incident on the quality determination instrument from the outside. For the reasons mentioned above, even higher quality determination of pasture grass is made possible.

BRIEF DESCRIPTION OF THE DRAWINGS

FIG. 1 is a perspective view illustrating a configuration of a pasture grass water content determination device, FIG. 2 is a side view illustrating a condition or form of pasture grass at the time of water content determination.

DETAILED DESCRIPTION OF PREFERRED EMBODIMENTS

Embodiment 1

[Pasture Grass Water Content Determination Device]

Figure 3:
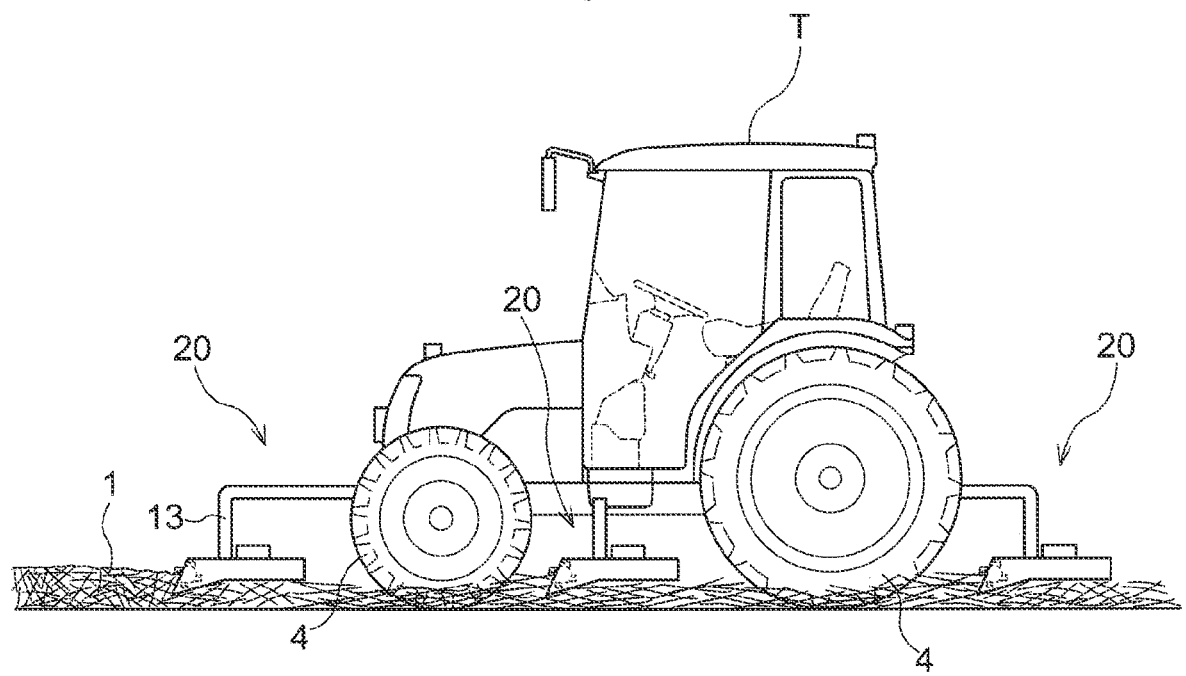
FIG. 3 is a view illustrating a work vehicle on which the pasture grass water content determination device is mounted.

Firstly, an example of arrangement of a pasture grass water content determination device (corresponding to a "quality determination device") to be mounted on a work vehicle relating to this embodiment will be explained.

A pasture grass water content determination device 20 is configured to take in harvested or reaped pasture grass 1 and compress them and then to determine the water content of the pasture grass 1 under their compressed state. This pasture grass water content determination device 20 is mounted on a work vehicle which travels in a pasture land and determines the water content of the pasture grass 1 while moving in association of traveling of the work vehicle. The pasture grass water content determination device 20 includes a spectroscopy analyzer (corresponding to a "quality determination instrument") 9, a grass sending tube 21 and a raking-in section (corresponding to a "grass taking section") 22.

The grass sending tube 21 comprises a tubular structure including two side walls 21a, a bottom portion 21b and a top plate portion 21c. For instance, all of the side walls 21a, the bottom portion 21b and the top plate portion 21c are plate-like members. Each one of the two side walls 21a is disposed erect at the opposed ends of the bottom portion 21b and face each other. The top plate portion 21c, in the area forwardly of the grass sending tube 21, extends across and between the two side walls 21a and faces the bottom portion 21b. Here, the front end portion of the grass sending tube 21 corresponds to the inlet of the grass sending tube 21 via which the pasture grass 1 are taken in.

The raking-in section 22 is supported to be pivotable about an axis P extending between the two side walls 21a, with the raking-in section 22 extending across and between the two side walls 21a in the area forwardly of the grass sending tube 21. The raking-in section 22 includes a cylinder 22a and blades 22b. The cylinder 22a is a cylindrical member rotatable about the axis P. The blades 22b protrude from the cylinder 22a and are provided in a plurality on the surface of the cylinder 22a in juxtaposition in the rotational direction. In operation, as the blades 22b are rotated about the axis P in association with rotation of the cylinder 22a, the pasture grass 1 are raked in to be packed inside the grass sending tube 21. For instance, four such blades 22b will be provided on the cylinder 22a. Further, preferably, each blade 22b has a plurality of pawls 22c at its leading end. With provision of such pawls 22c, the blades 22b can rake in the pasture grass 1 in an efficient manner. Further alternatively, each blade 22b may be bent in the rotational direction at its leading end area. With this arrangement too, the blades 22b can rake in the pasture grass 1 in an efficient manner.

The raking-in section 22 rakes in at least some of the pasture grass 1 and packs them one after another to the inside of the grass sending tube 21 via its inlet. Thus, the pasture grass 1 inside the grass sending tube 21 are compressed to obtain a higher density. The pasture grass 1 which have passed through the inside of the grass sending tube 21 are discharged via a discharging output which is the rear end of the grass sending tube 21. The discharged pasture grass 1 are merged with pasture grass 1 which were not raked in.

The spectroscopy analyzer 9 is disposed across and between the two side walls 21a in the upper area of the grass sending tube 21. For instance, the spectroscopy analyzer 9 will be disposed rearwardly of the top plate portion 21c and placed in contact with this top plate portion 21c. The spectroscopy analyzer 9 is disposed toward a determination head 8 inside the grass sending tube 21 between the two side walls 21a to face the pasture grass 1 compressed inside the grass sending tube 21. With these arrangements, the spectroscopy analyzer 9 can determine a water content of the pasture grass 1 which were compressed inside the grass sending tube 21. The spectroscopy analyzer 9 irradiates a light 7 (see FIG. 4) such as near infrared beam from the determination head 8 and receives the light which passed through the pasture grass 1 and returned after repeated reflections. Then, the spectroscopy analyzer 9 analyzes the received light 7 (see FIG. 4) to determine the water content of the pasture grass 1.

With the above-described arrangements, the spectroscopy analyzer 9 can irradiate the light 7 (see FIG. 7) onto the pasture grass 1 which have been sufficiently compressed inside the grass sending tube 21, so that as will be described later with reference to FIG. 4, diffused reflection of the irradiated light 7 (see FIG. 4) by the pasture grass 1 is suppressed. As a result, the spectroscopy analyzer 9 can determine the water content of the pasture grass 1 with accuracy by appropriately receiving the light (see FIG. 4) which passed through the pasture grass 1.

Further, since the grass sending tube 21 has an annular structure, light is shielded at least in the vicinity of the spectroscopy analyzer 9 inside the grass sending tube 21 and incidence of light from the outside to the pasture grass 1 packed inside the grass sending tube 21 is suppressed. For this reason too, the spectroscopy analyzer 9 can determine the water content of the pasture grass 1 with high accuracy by receiving only the light (see FIG. 4) which passed through the pasture grass 1.

Moreover, in the left pasture grass 1, due to e.g. difference of drying speeds, unevenness of their water contents may occur therein between the upper layer area and the lower layer area of the pasture land. With use of a pasture grass water content determination device 20, the pasture grass 1 are stirred and mixed together when they are raked in by the raking-in section 22. As a result, the pasture grass 1 having uneven water contents are fed in a mixed state to the spectroscopy analyzer 9, so that the spectroscopy analyzer 9 can determine an average water content of the pasture grass 1 left in the pasture land.

[Work Vehicle]

A work vehicle relating to this embodiment mounts the pasture grass water content determination device 20 described above. Next, with reference to FIG. 3 in combination with FIG. 2, modes of using the pasture grass water content determination device 20 by the work vehicle relating to this embodiment will be explained. The following explanation is explanation using a tractor T as the work vehicle.

The pasture grass water content determination device 20 is mounted on the tractor T, with a supporting portion 13 being connected to a machine body front end (e.g. the front end of the machine body frame) of the tractor T.

The pasture grass water content determination device 20 may be used in the case of the tractor T traveling forwardly or in the case of the tractor T traveling reversely. Yet, under its in-use state, the pasture grass water content determination device 20 will be mounted in such a manner that the inlet of the grass sending tube 21 is oriented to the front side in the advancing direction of the tractor T. Namely, the pasture grass water content determination device 20 is mounted such that the raking-in section 22 is positioned forwardly of the spectroscopy analyzer 9, relative to the front side of the advancing direction of the tractor T.

Here, pasture grass 1 grown in a pasture land are reaped and sun-dried (dried) in the pasture land, if needed. Sometimes, for readiness of collecting the pasture grass 1, the pasture grass 1 may be left in the pasture land when appropriate and laid in the form of ridge. A tractor T will travel on such pasture grass 1 reaped in the pasture land and the raking-in section 22 will rake in the pasture grass 1 in association with traveling of the tractor T and the pasture grass 1 will be compressed inside the grass sending tube 21. And, the spectroscopy analyzer 9 determines the water content of the pasture grass 1 under the compressed state.

[Determination of Water Content]

Next, with reference to FIG. 4, there will be explained traveling of the light 7 irradiated at the time of determination of the water content and accuracy of the determination.

As described above, the reaped grass 1 are left in the pasture land when necessary and then the pasture grass 1 will be left as they are after being reaped or collected in the form of ridge for facilitating subsequent work. In either case, the pasture grass 1 in a pasture land are present under a natural state without being subjected to any special compression and exist in a sparse state with gaps present therebetween In this way, if the light 7 is irradiated from the spectroscopy analyzer 9 onto the pasture grass 1 which are under such sparse state, the light 7 will be reflected by the pasture grass 1 due to the spaces present between the pasture grass 1. If diffused reflection of the irradiated light 7 occurs as described above, the light will be scattered in an uncontrolled manner, so the light 7 may fail to return to the determination head 8 of the spectroscopy analyzer 9. In this case, determination of the water content of the pasture grass 1 becomes impossible. As a result, relative to the irradiated light 7, the ratio of the light 7 returning to the determination head 8 becomes smaller, making accurate determination of the water content of the pasture grass 1 impossible.

On the other hand, if the light 7 is irradiated from the spectroscopy analyzer 9 onto the pasture grass 1 which are under a dense state, the light 7 passed through a certain pasture grass 1 will reach next pasture grass 1 immediately, so diffused reflection occurs less likely. Thus, the light which has passed through some pasture grass 1 will not diffuse and will readily return to the determination head 8. As a result, there is high likelihood of a sufficient amount of light 7 returning to the determination head 8 after passage through the pasture grass 1, so that accurate determination of water content of the pasture grass 1 is made possible.

And, since such accurate determination of water content of the pasture grass 1 is made possible, it becomes possible to make a work plan at a timing optimal for carrying out a next work or to take such an action as adding an additive, etc. Further, if a communication device (not shown) is provided additionally for transmitting the determined water content to a server or the like for managing a silo, etc., it will become possible to manage the silo or the like in accordance with the water content of the pasture grass 1 stored therein. For the reasons mentioned above, high quality forage can be produced easily. Moreover, since the water content determination is possible while traveling in the pasture land in a scanning manner, if position information of the pasture land can be obtained by means of e.g. GPS or the like, the position information and the water content can be correlated with each other to generate the distribution of water content in the pasture land in the form of a map also.

Figure 4:
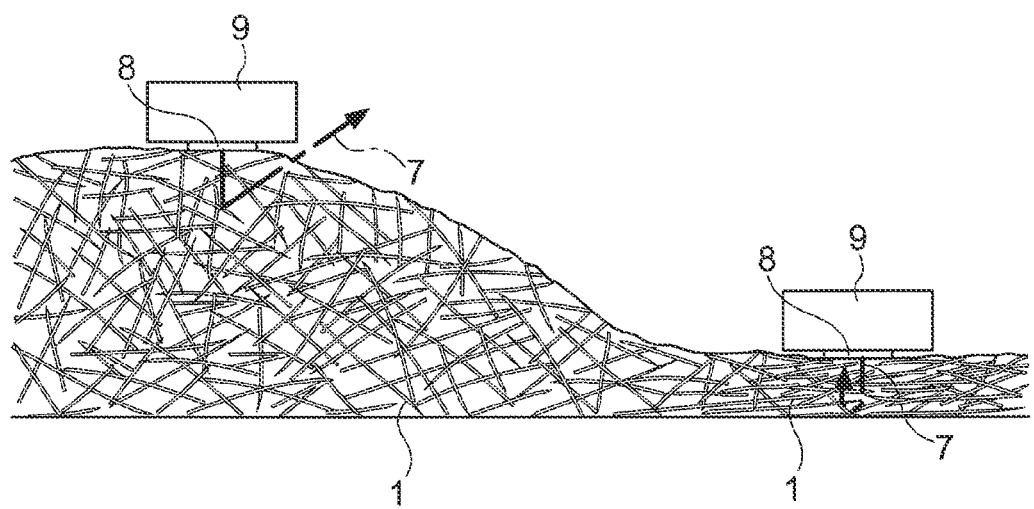
FIG. 4 is a view for explaining relationship between density of pasture grass and traveling of light.

As shown in FIG. 1, FIG. 2 and FIG. 4, the pasture grass water content determination device 20 relating to this embodiment allows the spectroscopy analyzer 9 to irradiate the light 7 onto the pasture grass 1 under a dense state by pushing the pasture grass 1 into the grass sending tube 21 for their compression therein. Therefore, the water content of the pasture grass 1 can be determined accurately.

Here, since the spectroscopy analyzer 9 determines the water content of the pasture grass 1 with use of the light 7, accurate determination of the water content becomes impossible if light incident from the outside other than the light 7 irradiated by the spectroscopy analyzer 9 enters the determination head 8.

Then, in the pasture grass water content determination device 20 relating to this embodiment, as described above, the spectroscopy analyzer 9 is installed in such a manner to cover the area upwardly of the grass sending tube 21. Therefore, the determination head 8 of the spectroscopy analyzer 9 can irradiate the light 7 onto the pasture grass 1 which are covered by the spectroscopy analyzer 9, so that the water content of the pasture grass 1 can be made in the area where intrusion of light is blocked by the grass sending tube 21 including the spectroscopy analyzer 9. Consequently, incidence of light from the outside to the determination head 8 is suppressed and the water content of the pasture grass 1 can be determined even more accurately.

Modified Embodiments of Embodiment 1

(1) The pasture grass water content determination device 20 can be disposed to protrude rearwardly from the machine body rear end of the tractor T. In this case, the pasture grass water content determination device 20, when used, will be towed on the pasture land in association with forward traveling of the tractor T. Further, the pasture grass water content determination device 20 can be disposed at a lower portion of the tractor T, e.g. between the front and rear wheels 4, in which case the pasture grass water content determination device 20 when used will be used to move on the pasture land in association with forward traveling of the tractor 20.

(2) The work vehicle on which the pasture grass water content determination device 20 is mounted is not limited to a tractor T, but may be various kinds of work vehicles or a tractor T mounting various implements for carrying out various kinds of utility works. And, the pasture grass water content determination device 20 mounted on such work vehicles will take pasture grass 1 left in a pasture land into the grass sending tube 21 and determine the water content thereof inside this grass sending tube 21.

Figure 5:
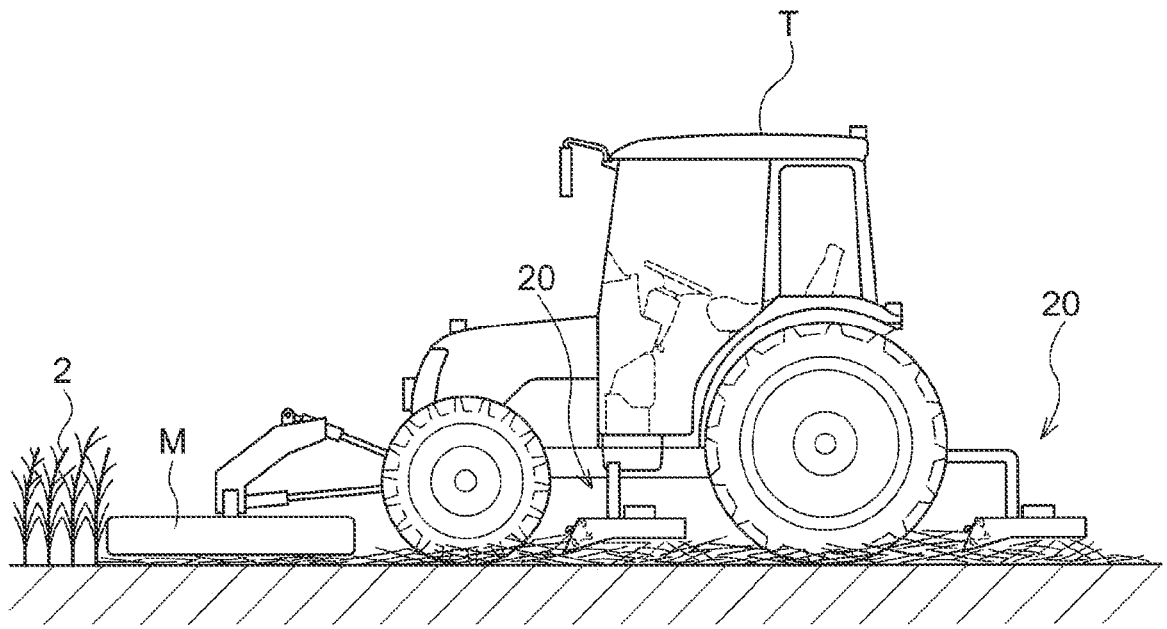
FIG. 5 is a view illustrating a work vehicle on which the pasture grass water content determination device is mounted.

For instance, the pasture grass water content determination device 20, as shown in FIG. 5, may be provided in a rear area or a lower area of a tractor T mounting a reaping section M in a front area thereof. Further alternatively, the pasture grass water content determination device 20 may be provided in a front area, a rear area or a lower area of a self-propelled grass mower vehicle. Thus, the device may be provided in any area where it can be mounted.

The reaping section M mounted on a tractor T or the self-propelled grass mower vehicle will reap pasture grass 1 planted in a pasture land. The pasture grass 1 reaped in the pasture land will be taken into the grass sending tube 21 in association with passage of the pasture grass water content determination device 20 and their water content will be determined. With this, the water content of the pasture grass 1 can be determined accurately.

(3) Further, the work vehicle mounting the pasture grass water content determination device 20 may be a work vehicle configured to carry out work travel while collecting the pasture grass 1 in a pasture land. Such work vehicles are equipped with a conveying path 3 for conveying the collected pasture grass 1. Then, the pasture grass water content determination device 20 will be mounted to the conveying path 3 with bypassing this conveying path 3.

Figure 6:
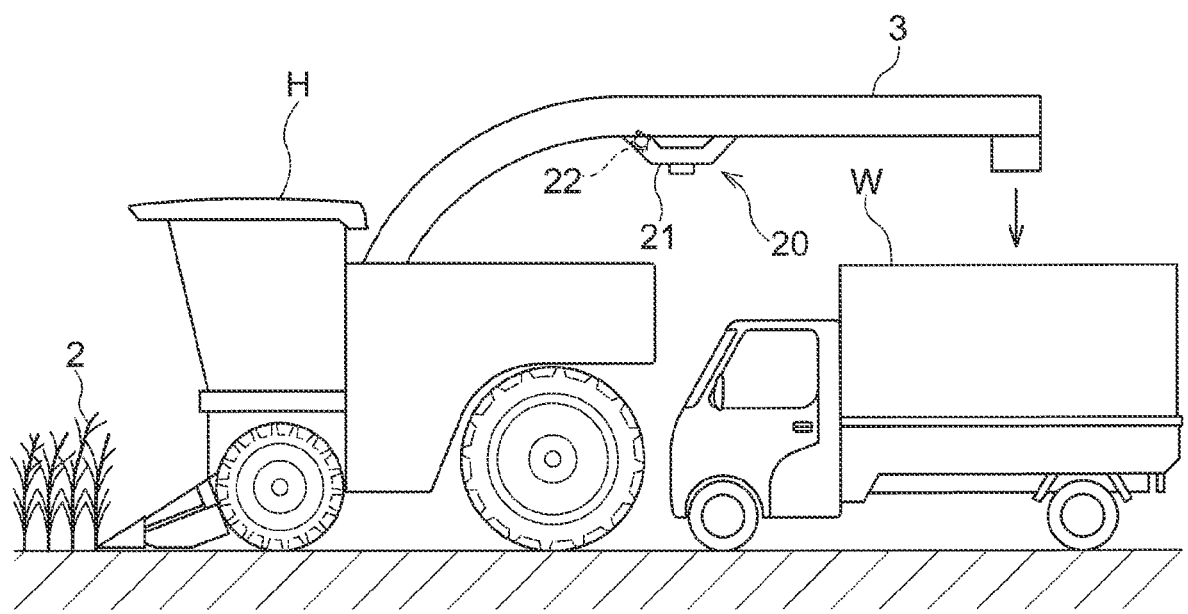
FIG. 6 is a view illustrating a work vehicle on which the pasture grass water content determination device is mounted.
Figure 8:
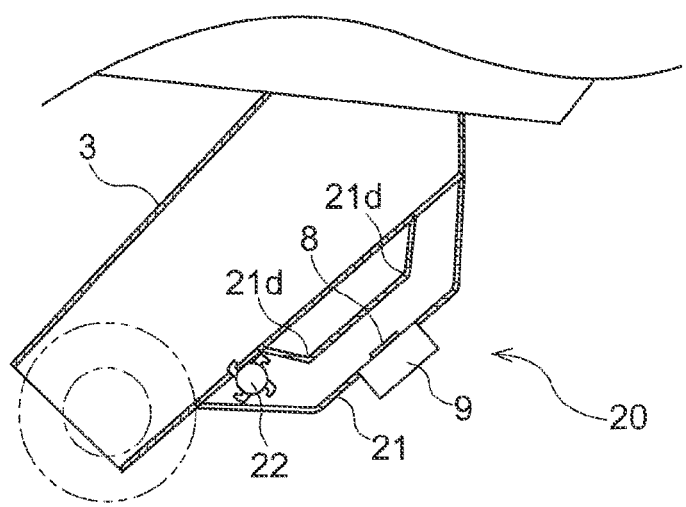
FIG. 8 is a view illustrating a form of the pasture grass water content determination device to be mounted on a conveying device.

For example, as shown in FIG. 6, the work vehicle can be a harvester H. The harvester H collects the pasture grass 1 in a pasture land and discharges them onto a loader wagon W or the like. Then, the loader wagon W or the like will convey the collected pasture grass 1 to a silo, etc. The harvester H will convey the collected pasture grass 1 via the conveying path 3 and discharge the pasture grass 1 from the conveying path 3 onto the loader wagon W, etc. The pasture grass water content determination device 20 is mounted in this conveying path 3, with the inlet and the discharging outlet of the pasture grass water content determination device 20 being connected to the conveying path 3. For instance, the pasture grass water content determination device 20 may be mounted in the conveying path 3 via an attachment or the like. It will suffice as long as the raking-in section 22 can guide at least some of the pasture grass 1 conveyed in the conveying path 3 into the grass sending tube 21. Further, as shown in FIG. 8, the pasture grass water content determination device 20 may include a curved portion 21d at least at one position of the grass sending tube 21. With this, the pasture grass water content determination device 20 can be readily mounted in the conveying path 3 and also the pasture grass water content determination device 20 can be readily mounted in the conveying path 3 in such a manner to dispose the raking-in section 22 to readily rake in the pasture grass 1 inside the conveying path 3.

Figure 7:
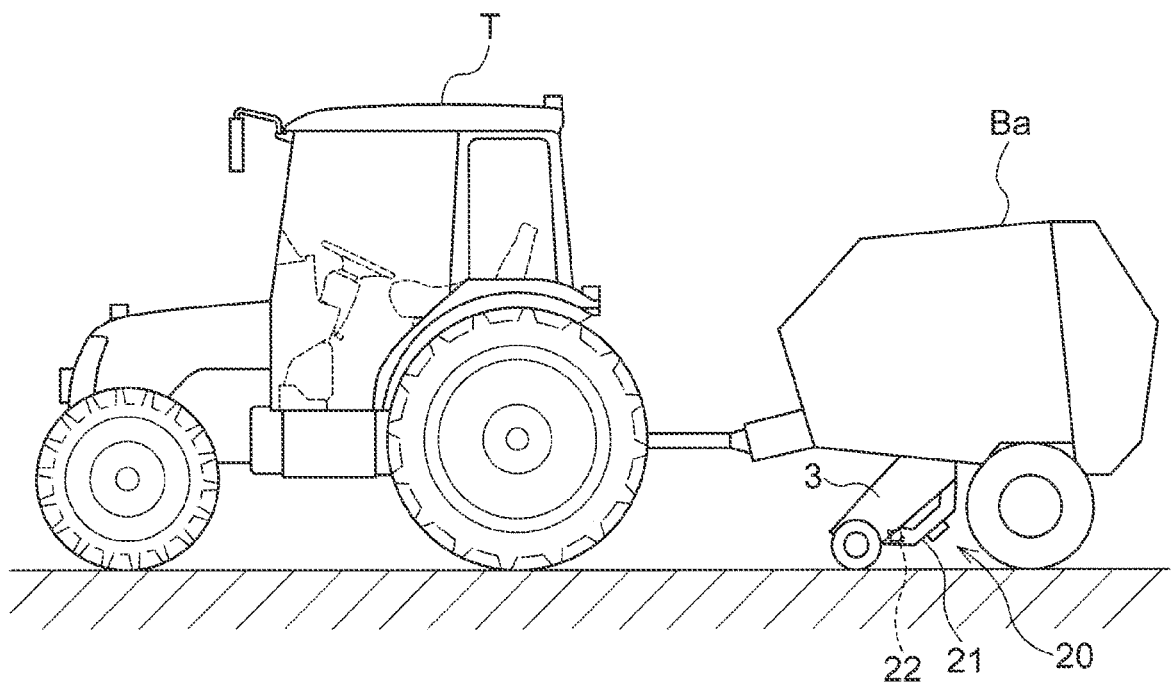
FIG. 7 is a view illustrating a work vehicle on which the pasture grass water content determination device is mounted.

Moreover, as shown in FIG. 7, the work vehicle can be a tractor T which tows a roll baler Ba as an "implement" or a self-propelled type roll baler Ba. The roll baler Ba collects pasture grass 1 in a pasture land and forms the pasture grass 1 into a roll bale, The roll baler Ba conveys the collected pasture grass 1 to an area for forming such a roll bale via the conveying path 3. And, the pasture grass water content determination device 20 will be mounted in this conveying path 3 with the inlet and the discharging outlet of the pasture grass water content determination device 20 being connected to the conveying path 3. For instance, the pasture grass water content determination device 20 may be mounted in the conveying path 3 via an attachment or the like. It will suffice as long as the raking-in section 22 can guide at least some of the pasture grass 1 conveyed in the conveying path 3 into the grass sending tube 21. Further, the pasture grass water content determination device 20 such as the one as shown in FIG. 8 may include a curved portion 21d in at least one position of the grass sending tube 21. With this, the pasture grass water content determination device 20 can be readily mounted in the conveying path 3 and also the pasture grass water content determination device 20 can be readily mounted in the conveying path 3 in such a manner to dispose the raking-in section 22 to readily rake in the pasture grass 1 inside the conveying path 3. Incidentally, since the pasture grass water content determination device 20 illustrated in FIGS. 6 through 8 is provided in the conveying path 3, the supporting portion 13 need not be provided.

As described above, if the pasture grass water content determination device 20 is provided in a harvester H or a roll baler Ba, the water content of the pasture grass 1 can be determined immediately before these pasture grass 1 are conveyed to a silo or the like or a roll bale is formed by the roll bailer Ba. Therefore, it becomes possible to effect any appropriate measure such as appropriately adjusting an additive to be added in the silo or the like or effecting addition of an additive required for water content adjustment in the process of roll bale formation or suspending the formation of roll bale per se.

(4) The cross sectional area of the grass sending tube 21 may be uniform, but this cross sectional area alternatively may progressively decrease in the entire grass sending tube 21 or in at least a part thereof before the spectroscopy analyzer 9, from the front end (inlet) to the rear end (discharging outlet). In this case, at least one of the bottom portion 21b, the side walls 21a and the top plate portion 21c may be tilted to the inner side of the grass sending tube 21, or an inclined face may be provided in the inner face of the grass sending tube 21. Further, the arrangement of the grass sending tube 21 is not limited to the arrangement having the bottom portion 21b, the side walls 22a and the top plate portion 21c, but the grass sending tube 21 may be any pipe into which raked-in pasture grass 1 are to be sent, and its cross sectional shape may be any shape.

(5) The spectroscopy analyzer 9 can effect not only the determination of water content, but can effect also determination of various qualities (properties) which can be determined optically. Further, the light 7 is not limited to near infrared beam, but may be other electromagnetic wave such as microwave, etc. Moreover, the technique of determining quality such as water content is not limited to spectroscopic analysis, but the technique may employ various kinds of determination instruments or determination methods such as determination using electrostatic capacitance.

(6) The spectroscopy analyzer 9 may be provided across and between the two side walls 21a. Alternatively, it may be supported, with gaps relative to the two side walls 21a, (7) The pasture grass water content determination device 20 may be supported to the work vehicle via an elastic body (not shown) such as a spring. Specifically, the pasture grass water content determination device 20 may be supported to one end of the supporting portion 13 via an elastic body (not shown) such as a spring The other end of the supporting portion 13 is supported to the work vehicle. With this arrangement, when the pasture grass water content determination device 20 passes over the pasture grass 1 in association with traveling of the work vehicle, even if the pasture grass water content determination device 20 tends to rise due to the pressure from the pasture grass 1, the pasture grass water content determination device 20 will be pushed down by the elastic force of the elastic body (not shown) such as a spring. Therefore, the pasture grass water content determination device 20 will follow e.g. undulation of the pasture grass 1 and the pasture grass 1 can be raked in in more efficient manner.

(8) The top plate portion 21c may be provided to extend to a position covering the raking-in section 22 from above or may be provided in such a manner not to cover the vicinity of the inlet of the grass sending tube 21 in which the raking-in section 22 is provided. The raking-in section 22 may be pivotally supported inside the grass sending tube 21, but as long as it can feed the pasture grass 1 into the grass sending tube 21, the raking-in section 22 may be provided at a position away from the grass sending tube 21. The raking-in section 22 acting as a "grass taking section" may be configured to take the pasture grass 1 into the grass sending tube 21 with rotation of a blade 22b. But, it may have any arrangement as long as it can take the pasture grass 1 into the grass sending tube 21. For instance, the raking-in section 22 may comprise a suction instrument for sucking the pasture grass 1.

(9) The blade 22b may be provided as a single blade in the width direction of the cylinder 22a. Alternatively, a plurality of blades 22b may be provided in the width direction of the cylinder 22a. Namely, at least one or some of blades 22b disposed side by side in the circumferential direction of the cylinder 22a may comprise a plurality of blades 22b juxtaposed in the width direction of the cylinder 22a

(10) The layout of the spectroscopy analyzer 9 is not limited to the layout of it being provided in contact with the top plate portion 21c rearwardly of this top plate portion 21c, but it may be provided with a spacing relative to the top plate portion 21c. Further, the end portion of the spectroscopy analyzer 9 may be placed on the top plate portion 21c.

(11) The raking-in section 22 can be configured to be capable of adjusting the amount of pasture grass 1 to be fed into the grass sending tube 21 in proportion with the traveling speed of the work vehicle. With this, an appropriate amount of pasture grass 1 will be fed into the grass sending tube 21 at an appropriate speed, so that the pasture grass 1 can be compressed in an efficient manner. For instance, the raking-in section 22 may be configured such that the rotational speed of the cylinder 22a is varied in accordance with the traveling speed of the work vehicle.

Embodiment 2

[Pasture Grass Water Content Determination Device]

Firstly, with reference to FIG. 9 and FIG. 10, an example of arrangement of a pasture grass water content determination device (corresponding to a "quality determination device") to be mounted on a work vehicle relating to this embodiment will be explained.

A pasture grass water content determination device 10 is configured to compress reaped pasture grass 1 and to determine the water content of the pasture grass 1 under their compressed state. This pasture grass water content determination device 10 is mounted on a work vehicle which travels in a pasture land and determines the water content of the pasture grass 1 while moving in association of traveling of the work vehicle. The pasture grass water content determination device 10 includes a spectroscopy analyzer (corresponding to a "quality determination instrument") 9, a grass pressing device 12 and a supporting portion 13 in the form of a parallel link structure. The pasture grass water content determination device 10 further includes a frame 11 supported to the supporting portion 13.

The grass pressing device 12 is supported to the frame 11 and presses the pasture grass 1 in a pasture land. The grass pressing device 12 includes a grass collecting portion 12a and a grass pressing portion 12b.

The grass collecting portion 12a comprises a plate-like member and is attached to the frame 11 to protrude forwardly from this frame 11 Here, the language "forwardly" corresponds to the direction of traveling of a work vehicle mounting the pasture grass water content determination device 10 in work travel for determination of water content of the pasture grass 1. The bottom face of the grass collecting portion 12a has a shape which rises forwardly. In other words, the bottom face of the grass collecting portion 12a has a height from the ground surface which increases forwardly. Specifically, the bottom face of the grass collecting portion 12a comprises combination of a curved face which protrudes upwards in the front area and a curved face which protrudes downwards in the base end side (rear side) area. The grass collecting portion 12a, with the above-described arrangement, collects or gathers the pasture grass 1 in the area downwardly of this grass collecting portion 12a in an efficient manner and can guide them to the area downwardly of the frame 11.

The grass pressing portion 12b is provided in the bottom area of the frame 11. The pasture grass 1 collected in the grass collecting portion 12a will be pressed along the slope of the grass collecting portion 12a and their compressed state is maintained in the area downwardly of the grass pressing portion 12b. The grass pressing portion 12b comprises a plate-like member or a member which is flat at least in its lower face. Relative to the bottom face of the grass pressing portion 12b, the grass collecting portion 12a is inclined, and the bottom face of the grass pressing portion 12b and the grass collecting portion 12a are formed continuous with each other. For instance, the grass pressing portion 12b and the grass collecting portion 12a will be formed integral with each other.

A spectroscopy analyze 9 is provided in the grass pressing portion 12b and determines the water content of the pasture grass 1. The spectroscopy analyzer 9 irradiates a light 7 (see FIG. 4) such as near infrared beam from a determination head 8 and receives the light 7 which passed through the pasture grass 1 and returned after repeated reflections. Then, the spectroscopy analyzer 9 analyzes the received light 7 (see FIG. 4) to determine the water content of the pasture grass 1.

An opening 12c is provided in the grass pressing portion 12b. The spectroscopy analyzer 9 is supported to the grass pressing portion 12b by being fitted in the opening 12c of this grass pressing portion 12b.

Thanks to the above-described arrangements, the spectroscopy analyzer 9 can irradiate the light 7 (see FIG. 4) onto the pasture grass 1 which have been compressed sufficiently by the grass pressing device 12, so that as has been described in details with reference to FIG. 4, diffused reflection of the irradiated light 7 (see FIG. 4) by the pasture grass 1 can be suppressed. As a result, the spectroscopy analyzer 9 can determine the water content of the pasture grass 1 with high accuracy by appropriately receiving the light (see FIG. 4) which has passed through the pasture grass 1.

[Work Vehicle]

A work vehicle relating to this embodiment mounts the pasture grass water content determination device 10 described above. Next, with reference to FIG. 11 in combination with FIG. 10, modes of using the pasture grass water content determination device 10 by the work vehicle relating to this embodiment will be explained. The following explanation is explanation using a tractor T as the work vehicle.

The pasture grass water content determination device 10 is mounted on the tractor T with the supporting portion 13 being connected to the machine body front end (e.g. the front end of the machine body frame).

The supporting portion 13 comprises a parallel link structure, so the pasture grass water content determination device 10 is vertically pivotable relative to the tractor T; thus vertical pivotal movements relative to the tractor T are allowed Further, since the supporting portion 13 comprises a parallel link structure, the grass pressing portion 12b is constantly maintained parallel with the ground surface. As a result, the grass pressing portion 12b can compress the pasture grass 1 uniformly.

The pasture grass water content determination device 10 may be used either when the tractor T travels forwardly or when the tractor T travels reversely. But, this pasture grass water content determination device 10 will be mounted such that the grass collecting portion 12a is oriented toward the front side in the advancing direction of the tractor T. Namely, the pasture grass water content determination device 10 will be mounted such that the grass collecting portion 12a is positioned more forwardly than the grass pressing portion 12b on the front side in the advancing direction of the tractor T.

Here, pasture grass 1 grown in a pasture land are reaped and sun-dried (dried) in the pasture land, if needed. Sometimes, for readiness of collecting the pasture grass 1, the pasture grass 1 may be left in the pasture land when appropriate and laid in the form of ridge for example. The tractor T will travel on such reaped pasture grass 1 in the pasture land, and in association with traveling of the tractor T, the grass pressing device 12 compresses the pasture grass 1. And, the spectroscopy analyzer 9 will determine the water content of the pasture grass 1 under the compressed state.

Figure 9:
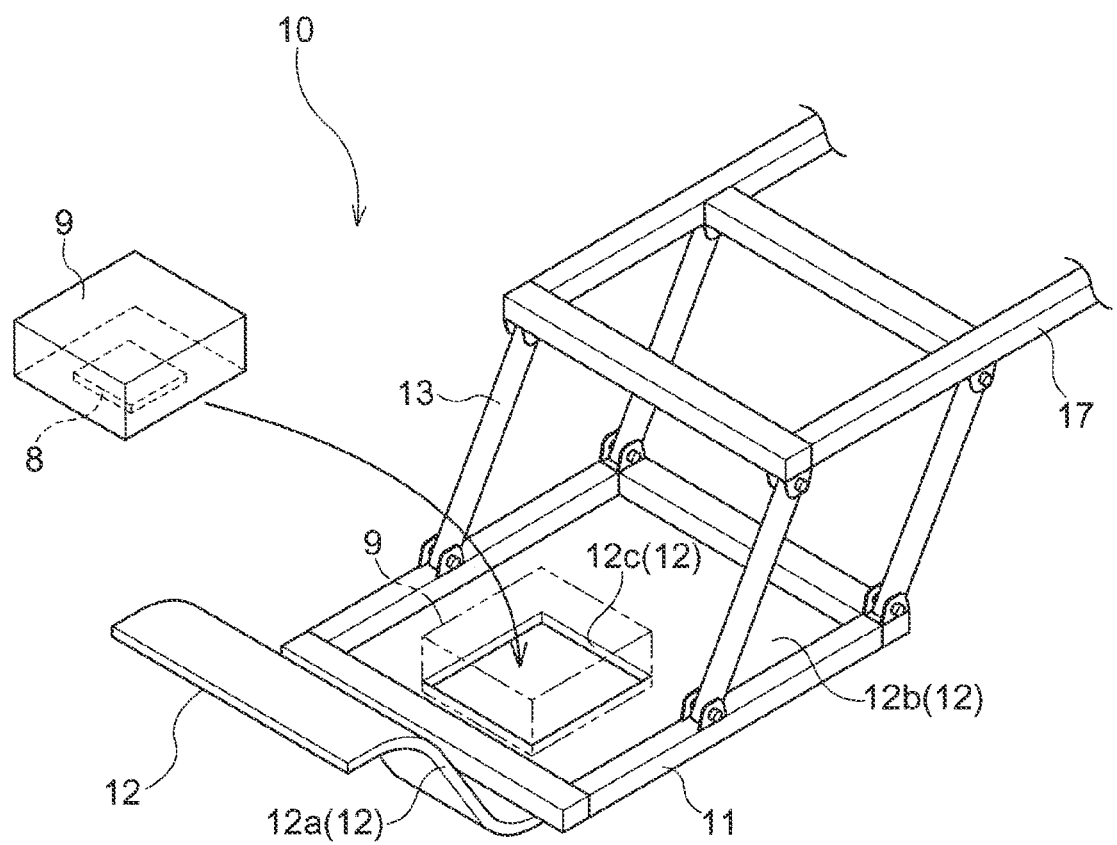
FIG. 9 is a perspective view illustrating an arrangement of the pasture grass water content determination device.
Figure 10:
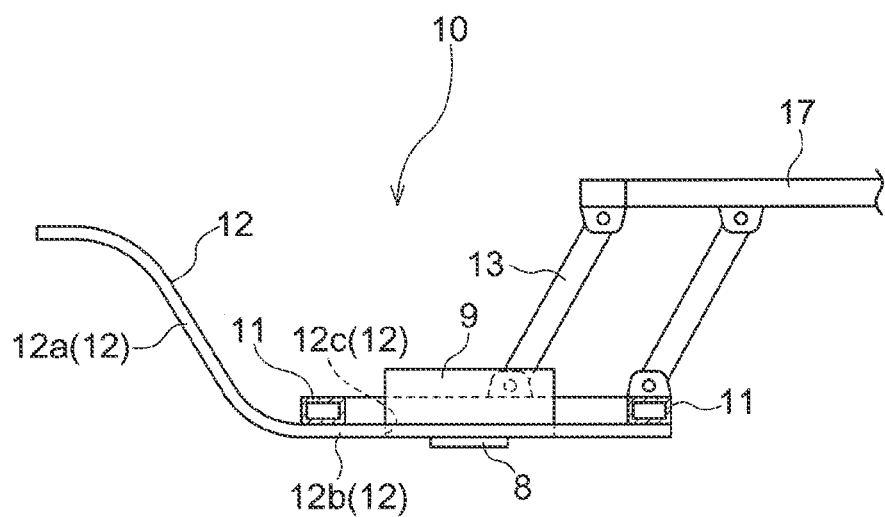
FIG. 10 is a section view illustrating a mounting arrangement of the pasture grass water content determination device.
Figure 11:
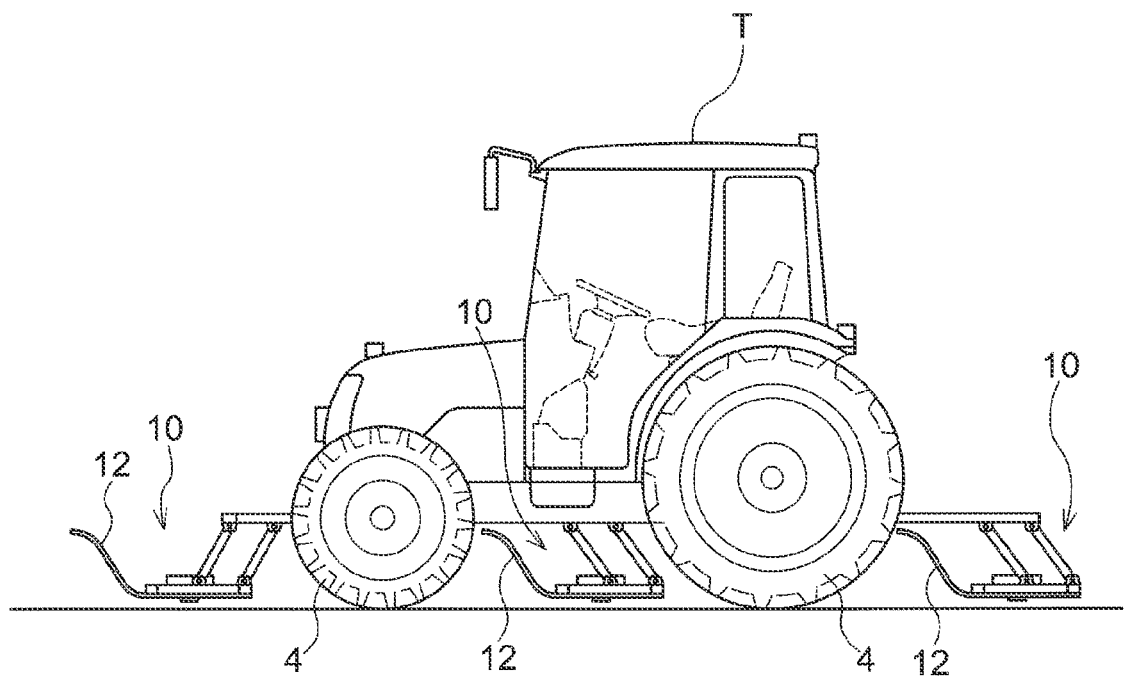
FIG. 11 is a view illustrating a work vehicle on which the pasture grass water content determination device is mounted.

As shown in FIG. 9, FIG. 10 and FIG. 4, the pasture grass water content determination device 10 relating to the present embodiment, due to the inclusion of the grass pressing device 12, can press and compress the pasture grass 1, so that the spectroscopy analyzer 9 can irradiate the light 7 onto the pasture grass 1 under the dense state; therefore, the water content of the pasture grass 1 can be determined accurately.

Here, since the spectroscopy analyzer 9 determines the water content of the pasture grass 1 with use of the light 7, accurate determination of the water content becomes impossible if light incident from the outside other than the light 7 irradiated by the spectroscopy analyzer 9 enters the determination head 8.

In the case of the pasture grass water content determination device 10 relating to this embodiment, as described above, the spectroscopy analyzer 9 is disposed within the opening 12c provided in the grass pressing portion 12b. For instance, the spectroscopy analyzer 9 will be disposed such that the bottom face of the spectroscopy analyzer 9 is substantially flush with the bottom face of the grass pressing portion 12b. Therefore, the determination head 8 of the spectroscopy analyzer 9 can irradiate the light 7b onto the pasture grass 1 which are being pressed by the grass pressing portion 12b and the spectroscopy analyzer 9; and in addition, since the grass pressing portion 12b is larger than the spectroscopy analyzer 9, the water content can be determined for the pasture grass 1 in the area where intrusion of light is blocked by the spectroscopy analyzer 9 and the grass pressing portion 12b. As a result, incidence of light to the determination head 8 from the outside is suppressed, so that the water content of the pasture grass 1 can be determined even more accurately, Modified Embodiments of Embodiment 2

(1) The arrangement of the pasture grass water content determination device 10 is not limited to the arrangement of it being vertically pivotally supported to the machine body. Alternatively, the pasture grass water content determination device 10 may be configured to be vertically slidably to the machine body.

(2) The pasture grass water content determination device 10 may be disposed to protrude rearwardly from the machine body rear end of the tractor T, in which case the pasture grass water content determination device 10 is towed on the pasture land in association with forward traveling of the tractor T. Further alternatively, the pasture grass water content determination device 10 may be disposed at a lower portion of the tractor T, e.g. between the front and rear wheels 4, in which case the pasture grass water content determination device 10 will be moved on the pasture land in association with forward traveling of the tractor T.

Figure 12:
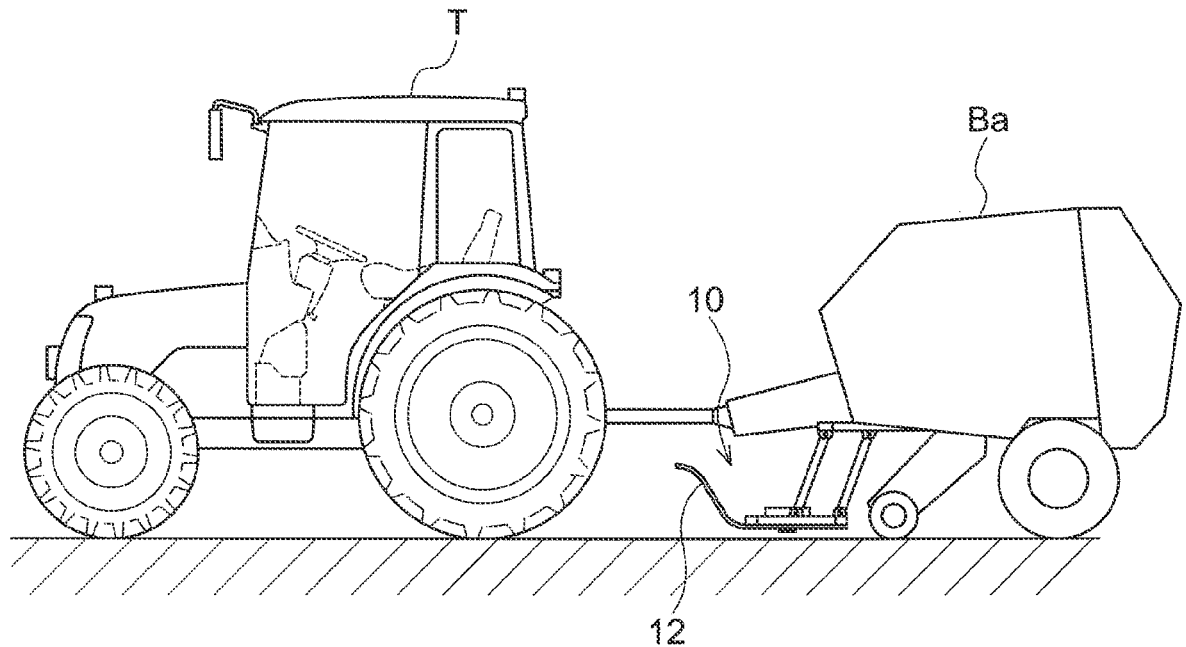
FIG. 12 is a view illustrating a work vehicle on which the pasture grass water content determination device is mounted.

(3) The work vehicle such as the tractor T may mount the pasture grass water content determination device 10 only, but it may mount the pasture grass water content determination device 10 together with other implement. For example, as shown in FIG. 12, in the case of the tractor T mounting a roll baler Ba as an "implement", the pasture grass water content determination device 10 may be mounted to the roll bailer Ba, or may be mounted to a self-propelled roll baler Ba. In the latter case, the pasture grass water content determination device 10 will be disposed forwardly of the area of the roll baler Ba for collecting the pasture grass 1.

If the pasture grass water content determination device 10 is disposed forwardly of the area of the roll baler Ba for collecting the pasture grass 1 as described above, the water content of the pasture grass 1 can be determined immediately before a roll bale is formed by the roll baler Ba. Therefore, in accordance with the water content of the pasture grass 1, it is possible take some appropriate measure such as addition of an additive required for water content adjustment in the process of forming the roll bale or suspending the formation of the roll bail per se.

Similarly, the pasture grass water content determination device 10 may be mounted not only to the roll baler Ba towed by the tractor T or the self-propelled roll baler Ba, but also to work vehicles of various configurations such as a loader wagon towed by the tractor T or a self-propelled loader wagon. With this, it is possible take some appropriate measure such as addition of an additive required for water content adjustment in the process of forming the roll bale or suspending the formation of the roll bale per se, in the course of various works carried out by the work vehicle.

Figure 13:
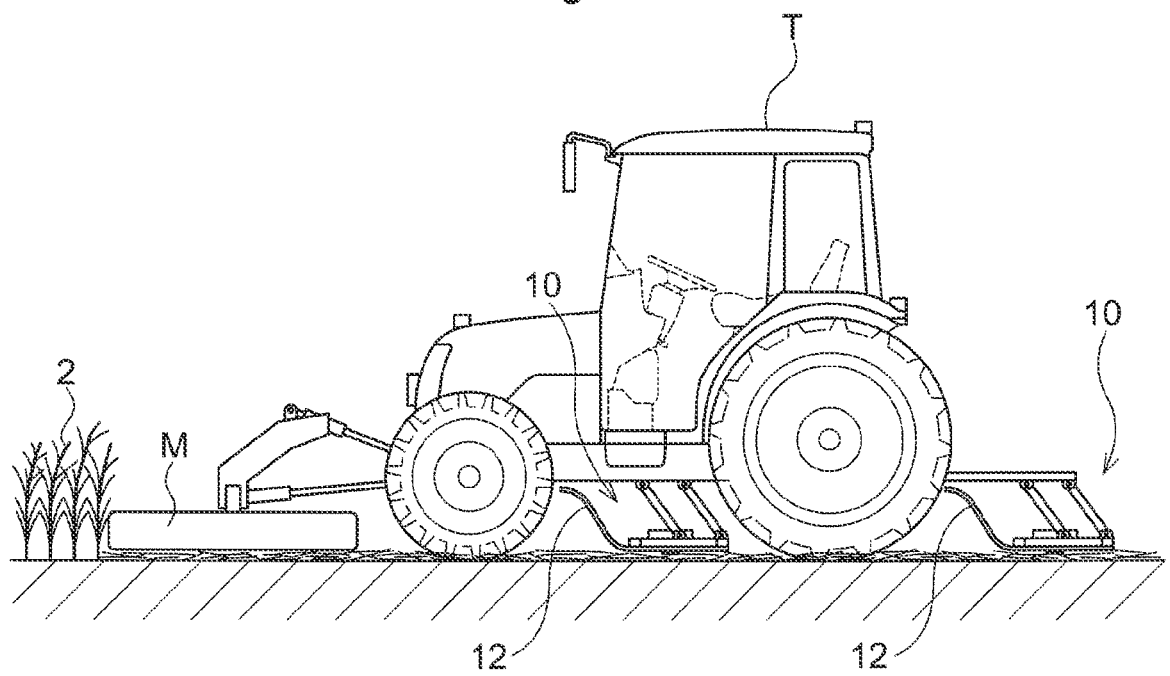
FIG. 13 is a view illustrating a work vehicle on which the pasture grass water content determination device is mounted.

(4) Further, the work vehicle mounting the pasture grass water content determination device 10 may effect the determination of water content of the pasture grass 1 not only for reaped pasture grass 1, but also may effect the determination of water content of the pasture grass 1, in addition to reaping of these pasture grass 1. For instance, as shown in FIG. 13, the pasture grass water content determination device 10 may be provided in a rear area or a lower area of the tractor T mounting a reaping section M in its front area. Further alternatively, the pasture grass water content determination device 10 may be provided in a rear area or a lower area of a self-propelled tractor T.

The reaping section M mounted on the tractor T or the self-propelled grass mower vehicle will reap the pasture grass 1 planted in a pasture land. The reaped pasture grass 1 in the pasture land will be compressed in association with passage of the pasture grass water content determination device 10 thereon and the water content thereof will be determined, With this, the water content of the pasture grass 1 can be determined with high accuracy in an efficient manner.

(5) The configuration of the grass pressing device 12 is not limited to the configuration of compressing the pasture grass 1 in association with traveling. Alternatively, the grass pressing device 12 may be configured to mechanically press the pasture grass 1.

(6) The grass pressing portion 12*b* may omit the opening 12*c*, and the pasture grass water content determination device 10 may be provided at any desired position as long as it can determine the water content of the pasture grass 1 under the compressed state. For instance, the pasture grass water content determination device 10 may be configured to be supported to the lower face of the grass pressing portion 12*b*.

(7) The use of the spectroscopy analyzer 9 is not limited to the determination of water content. The spectroscopy analyzer 9 can be used also for determinations of various qualities (properties) which can be determined optically. Further, the light 7 is not limited near infrared beam, but it may be any electromagnetic wave such as microwave. Further, the method of determination of qualities such as water content is not limited to the spectroscopy analysis, but the determination may employ various kinds of determination instruments or determination methods.

(8) The pasture grass water content determination device 10 may include an elastic body (not shown) such as a spring for urging the grass pressing device 12 downwards. With this, thanks to the elastic force of the elastic body (not shown) such a spring, the grass pressing portion 12*b* will be pressed downwards to press the pasture grass 1 in a reliable manner.

(9) The bottom face of the grass collecting portion 12*a* is not limited to the combination of two curved faces, but may include only one curved face protruding downwards. Further alternatively, the bottom face of the grass collecting portion 12*a* need not include any curved face at all. Further alternatively, the grass collecting portion 12*a* may have a shape whose left and right opposed ends rise up progressively.

(10) The spectroscopy analyzer 9 may be mounted on the grass pressing portion 12*b* at its opening 12*c*. In this case, the spectroscopy analyzer 9 will be supported such that the determination head 8 is disposed in the opening 12*c* to be positioned close to the compressed pasture grass 1 downwardly of the determination head 8.

INDUSTRIAL APPLICABILITY

The present invention allows determination of qualities of not only pasture grass, but of various kinds of plants and can be suitably used in various kinds of work vehicle.

DESCRIPTION OF SIGNS

1: pasture grass
3: conveying path
9: spectroscopy analyzer (quality determination instrument)
10: pasture grass water content determination device (quality determination device)
12: grass pressing device
12*c*: opening
13: supporting portion
15: elastic body
20: pasture grass water content determination device (quality determination device)
21: grass sending tube
22: raking-in section (grass taking section)
Ba: roll baler (work vehicle)
H: harvester (work vehicle)
M: reaping section
T: tractor (work vehicle)

The invention claimed in:

1. A work vehicle configured to carry out work travel in a pasture land where harvested pasture grass is present, the work vehicle comprising:
 a quality determination device configured to determine quality of pasture grass in a course of the work travel;
 wherein the quality determination device comprises:
  a cylindrical grass sending tube;
  a grass taking section configured to feed at least a portion of the pasture grass left in the pasture land to an inside of the grass sending tube via a first end of the grass sending tube; and
  a quality determination instrument configured to determine quality of the pasture grass compressed inside the grass sending tube,
 wherein the grass sending tube comprises an inclined face provided on an inner side thereof, the inclined face being inclined radially inward from the first end of the grass sending tube,
 wherein the grass sending tube has a sectional area that progressively decreases in size over at least a portion thereof between the first end of the grass sending tube and an area where the quality determination instrument is disposed,
 wherein the grass sending tube comprises:
  two side walls;
  a bottom portion; and
  a top plate portion, and
 wherein the bottom portion has the inclined face inclined from the first end toward the top plate portion.

2. The work vehicle of claim 1, wherein the portion of the pasture grass sent into the grass sending tube is discharged via a second end of the grass sending tube to be merged with a portion of the pasture grass which was not sent into the grass sending tube.

3. The work vehicle of claim 2, further comprising:
a conveying path for collecting and conveying the pasture grass,
wherein the first end and the second end of the grass sending tube are connected to the conveying path, and
wherein the grass sending tube bypasses the conveying path.

4. The work vehicle of claim 1, wherein the grass taking section is configured to adjust an amount of pasture grass sent into the grass sending tube in proportion with a traveling speed of the work vehicle.

5. The work vehicle of claim 1, wherein the quality determination device is disposed in a front portion of the work vehicle.

6. The work vehicle of claim 1, wherein the first end of the grass sending tube is an inlet communicating with an outside of the work vehicle, and the grass sending tube further comprises a second end as a discharging outlet communicating with the outside of the work vehicle.

7. A work vehicle comprising:
a harvesting section for the work vehicle to carry out harvesting travel in a pasture land; and
a quality determination device configured to determine quality of pasture grass while carrying out work travel;
wherein the quality determination device comprises:
a cylindrical grass sending tube;
a grass taking section configured to feed at least a portion of pasture grass harvested by the harvesting section to an inside of the grass sending tube via a first end of the grass sending tube; and
a quality determination instrument configured to determine quality of the portion of the pasture grass compressed inside the grass sending tube,
wherein the grass sending tube comprises an inclined face provided on an inner side thereof, the inclined face being inclined radially inward from the first end of the grass sending tube,
wherein the grass sending tube has a sectional area that progressively decreases in size over at least a portion thereof between the first end of the grass sending tube and an area where the quality determination instrument is disposed,
wherein the grass sending tube comprises:
two side walls;
a bottom portion; and
a top plate portion, and
wherein the bottom portion has the inclined face inclines from the first end toward the top plate portion.

8. The work vehicle of claim 7, wherein the portion of the pasture grass sent into the grass sending tube is discharged via a second end of the grass sending tube to be merged with a portion of the pasture grass which was not sent into the grass sending tube.

9. The work vehicle of claim 8, further comprising:
a conveying path for collecting and conveying the pasture grass,
wherein the first end and the second end of the grass sending tube are connected to the conveying path, and
wherein the grass sending tube bypasses the conveying path.

10. The work vehicle of claim 7, wherein the grass taking section is configured to adjust an amount of pasture grass sent into the grass sending tube in proportion with a traveling speed of the work vehicle.

11. The work vehicle of claim 7, wherein the quality determination device is disposed in a front portion of the work vehicle.

12. The work vehicle of claim 7, wherein the first end of the grass sending tube is an inlet communicating with an outside of the work vehicle, and the grass sending tube further comprises a second end as a discharging outlet communicating with the outside of the work vehicle.

* * * * *